US007007924B2

(12) United States Patent
Wilson

(10) Patent No.: US 7,007,924 B2
(45) Date of Patent: Mar. 7, 2006

(54) ONE-PIECE COIL CONDUIT

(75) Inventor: Kevin Wilson, Somers, CT (US)

(73) Assignee: Parker-Hannifin Corporation, Cleveland, OH (US)

( * ) Notice: Subject to any disclaimer, the term of this patent is extended or adjusted under 35 U.S.C. 154(b) by 18 days.

(21) Appl. No.: 10/737,331

(22) Filed: Dec. 16, 2003

(65) Prior Publication Data

US 2004/0262558 A1 Dec. 30, 2004

Related U.S. Application Data

(60) Provisional application No. 60/483,473, filed on Jun. 27, 2003.

(51) Int. Cl.
*F16K 31/02* (2006.01)

(52) U.S. Cl. .................................. 251/129.15; 335/292

(58) Field of Classification Search ........... 251/129.01, 251/129.15; 335/278, 292; 336/90, 96
See application file for complete search history.

(56) References Cited

U.S. PATENT DOCUMENTS 3,932,828 A * 1/1976 Plunkett et al. ............... 336/96
4,232,284 A * 11/1980 Phelon et al. ................. 336/90
4,438,418 A * 3/1984 Neff ........................... 335/255
4,982,498 A 1/1991 Umezaki
5,069,834 A 12/1991 Babitzka
5,185,919 A 2/1993 Hickey
5,423,117 A 6/1995 Okada et al.
6,012,700 A * 1/2000 Johnson et al. ........ 251/129.15
6,246,309 B1 * 6/2001 Heinz et al. ................ 335/299
6,311,473 B1 11/2001 Benjamin et al.
6,341,412 B1 1/2002 Romann et al.
6,550,696 B1 4/2003 Mansour et al.

* cited by examiner

*Primary Examiner*—Edward K. Look
*Assistant Examiner*—John K. Fristoe, Jr.
(74) *Attorney, Agent, or Firm*—Christopher H. Hunter

(57) ABSTRACT

A solenoid assembly for a valve includes a unitary, one-piece housing comprised of encapsulant. An electromagnetic device is completely encompassed by and embedded in the encapsulant. The device includes i) a bobbin and coil subassembly; ii) a terminal electrically connected to the coil; iii) a yoke surrounding the subassembly; iv) a flux plate electrically connected to the yoke and insulated from the coil such that a flux gap is provided between the coil and yoke; and v) a flux bushing closely received in the bobbin. Lead wires are electrically connected to the terminal and have one end embedded in the encapsulant. A hollow conduit receives and encloses the lead wires, and also has one end embedded in the encapsulant. Upon energization of the coil by current applied to the lead wires, electromagnetic forces generate a magnetic field which can be transmitted to a valve member received in the solenoid assembly.

32 Claims, 5 Drawing Sheets

ONE-PIECE COIL CONDUIT

CROSS-REFERENCE TO RELATED CASES

The present application claims the benefit of the filing date of U.S. Provisional Application Ser. No. 60/483,473; filed Jun. 27, 2003, the disclosure of which is expressly incorporated herein by reference.

FIELD OF THE INVENTION

The present invention relates generally to solenoid-actuated valve assemblies, particularly for fluid control applications.

BACKGROUND OF THE INVENTION

Solenoid actuated valve assemblies are commonly used to move an armature toward or away from a valve seat to control the flow of fluid. One application is in fuel pumps in gas stations, where a manifold block includes one or more valves, each of which is controlled by a solenoid assembly and normally in a closed position. The valves each include an armature which is operatively connected to a valve member, and is responsive to the energization of the, solenoid such that the valve member moves into an open position when the solenoid is actuated to dispense the gasoline. In applications where flammable vapor is present, the solenoid must be separated from the vapor to prevent ignition, and generally qualified for use in a hazardous location. This can include stringent and rigorous tests for torque, bending moment and pull per UL/NEC specifications. Conduit connections must also be evaluated for flame propagation.

To achieve the above, typically the conduit of the assembly is plumbed through a vapor barrier that separates the hazardous area (where vapors may be present) from the non-hazardous area. The lead wires for the solenoid are routed through the conduit to the control circuitry. The conduit and any fittings must be qualified as explosion-proof, but even so, are not considered to be vapor-tight. All passages (such as internal to the conduit) are potted with appropriate epoxy to prevent the vapors from passing through the conduit to the non-hazardous area. This all adds time and expense in manufacturing and assembling the solenoid assembly, increases the complexity of manufacture, and generally increases the cost in manufacturing the solenoid assembly. As such, it is believed there is a demand in the industry for a solenoid-controlled valve assembly which can be used in hazardous situations without i) having to go through a rigorous qualification process for conformance to explosion-proof conduit systems; and ii) required potting of a conduit system that is not vapor-tight.

SUMMARY OF THE PRESENT INVENTION

The present invention provides a solenoid-operated valve, appropriate for certain hazardous applications such a gasoline dispensing, which has an integral vapor barrier making the solenoid assembly inherently explosion-proof. An electromagnetic device for the solenoid assembly is completely embedded in encapsulant, which forms the housing for the solenoid assembly. Encapsulating the electromagnetic device creates a vapor-tight seal without the need for plumbing through a vapor barrier, or extensive potting of the conduit. Qualification for conformance to explosion-proof conduit systems is thereby not necessary.

According to the present invention, the solenoid assembly includes a unitary, one-piece housing comprised of encapsulant. An electromagnetic device is encompassed by and embedded in the encapsulant. The electromagnetic device includes i) a bobbin and coil subassembly, with the coil wound around the bobbin, and the bobbin defining a central cavity for receipt of an armature portion of a valve; ii) a pair of terminals electrically connected to the coil; iii) a yoke surrounding the subassembly; iv) a flux plate electrically connected to the yoke and electrically insulated from the coil such that a flux gap is provided between the coil and yoke; and (optionally) v) a flux bushing closely received in the bobbin for concentrating and enhancing the flux. The foregoing components are completely embedded and encompassed by the encapsulant, except for small exposed portions of the yoke and flux plate around openings into the solenoid assembly.

Lead wires are electrically connected to the terminal and have one end embedded in the encapsulant. A hollow conduit receives and encloses the lead wires, and also has one end embedded in the encapsulant. The lead wires extend the length of the conduit and can include a connector to allow easy connection to a current source.

Upon energization of the coil by current applied to the lead wires, electromagnetic forces generate a magnetic field, which is transmitted to the armature, which is operatively connected to a valve member, to thereby move the valve member into an open position.

An insulating plug at one end of the conduit provides additional rigidity to the assembly, seals the conduit end, and provides a locating and supporting feature for the lead wires. The flux plate can be staked or otherwise fixed to the insulating plug, and also to the yoke, to facilitate assembly.

The encapsulant can be injected into a mold, containing the components of the electromagnetic device. The encapsulant provides a one-piece, unitary housing for the solenoid assembly, which preferably resists high temperatures, has good chemical resistance and has sufficient flame retardance such that it is appropriate for fuel (gasoline) pumping and distribution applications. The encapsulant is also relatively easily moldable using conventional machinery and techniques.

Thus, the present invention provides a solenoid-operated valve, appropriate for certain hazardous applications, which has an integral vapor barrier making the solenoid assembly inherently explosion-proof. Encapsulating the components of the electromagnetic device of the solenoid assembly creates a vapor-tight seal without the need for plumbing through a vapor barrier, or extensive potting of the conduit. The integral conduit does not have to be qualified for conformance to explosion-proof conduit systems (as there are no threaded fittings), which reduces the cost of manufacturing the solenoid assembly.

Further features of the present invention will become apparent to those skilled in the art upon reviewing the following specification and attached drawings.

DETAILED DESCRIPTION OF THE PREFERRED EMBODIMENT

Figure 1:
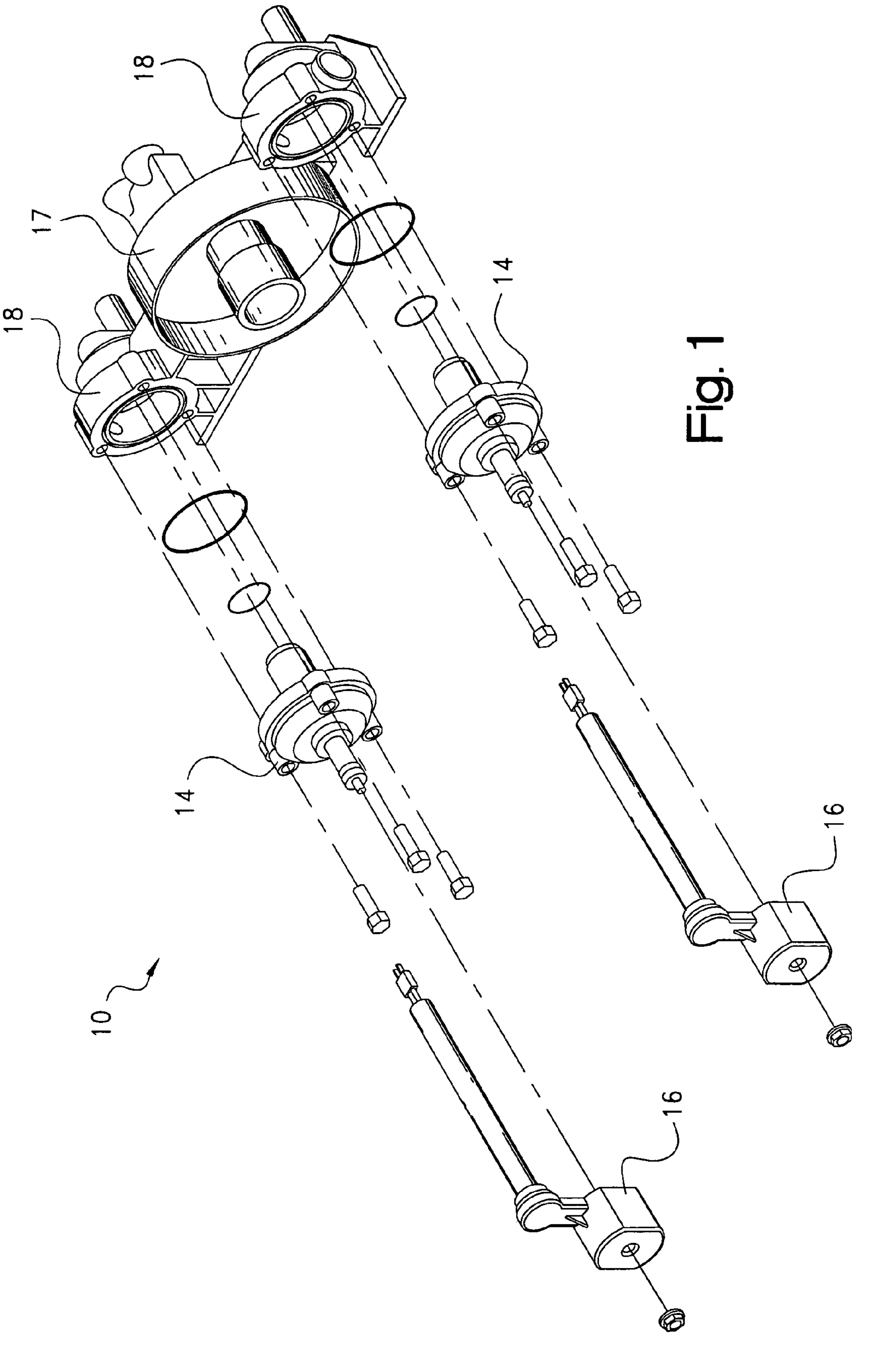
FIG. 1 is an exploded view of a manifold assembly including a valve assembly constructed according to the principles of the present invention.

Referring to the drawings, and initially to FIG. 1, a manifold assembly for a fluid system is shown generally at 10. The manifold assembly 10 includes a manifold block 12, one or more valves as at 14, and a solenoid assembly 16 for actuating each valve. Various hardware and seals (not numbered) are provided for mounting and sealing purposes between the manifold block, valves and solenoid assemblies. The manifold assembly 10 is particularly adapted for a fuel pump and distribution system (such as found at a gas station), however, the principles of the present invention are believed applicable to other types of fluid control systems, where accurate control of a fluid stream is necessary or desirable.

Figure 2:
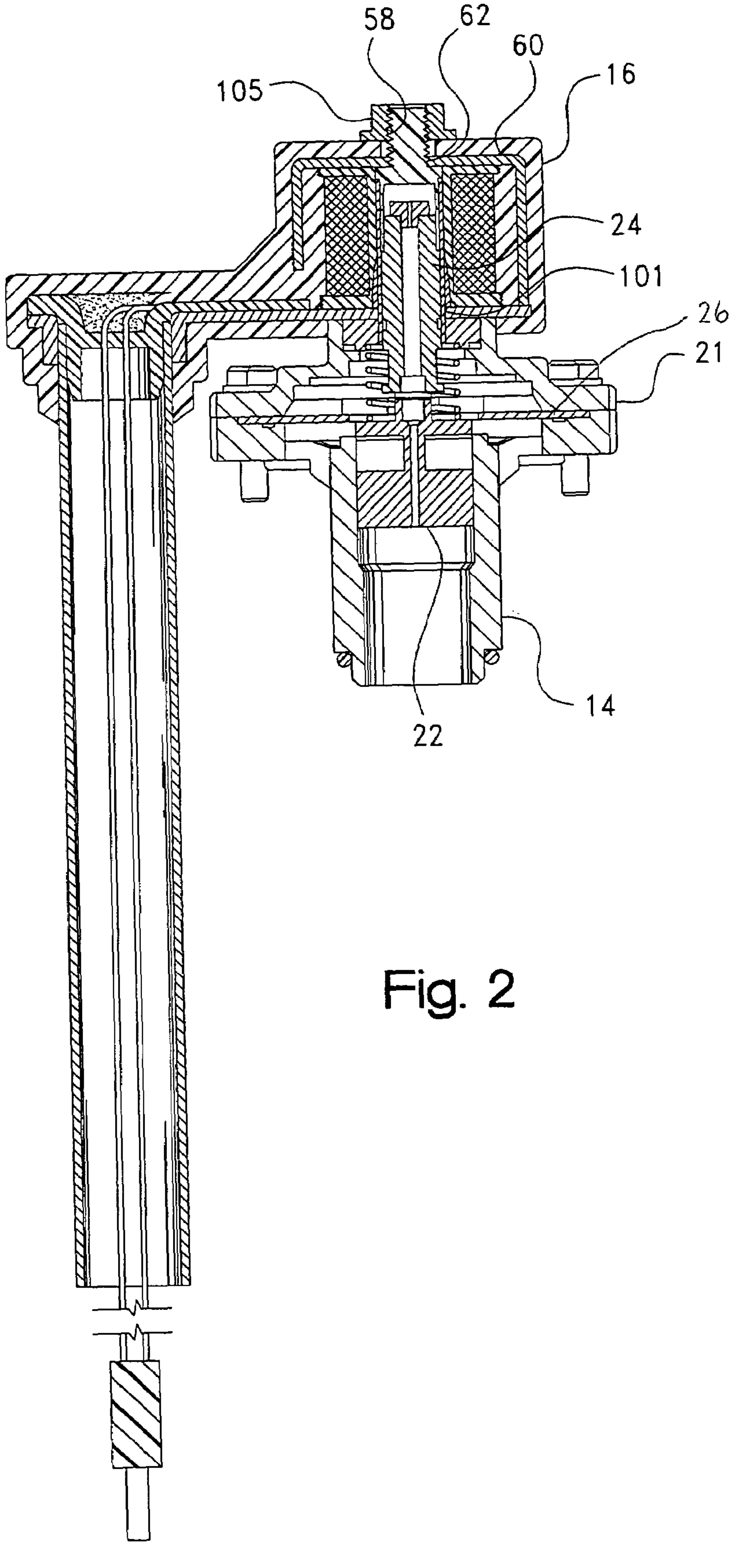
FIG. 2 is a cross-sectional side view of the valve assembly.
Figure 3:
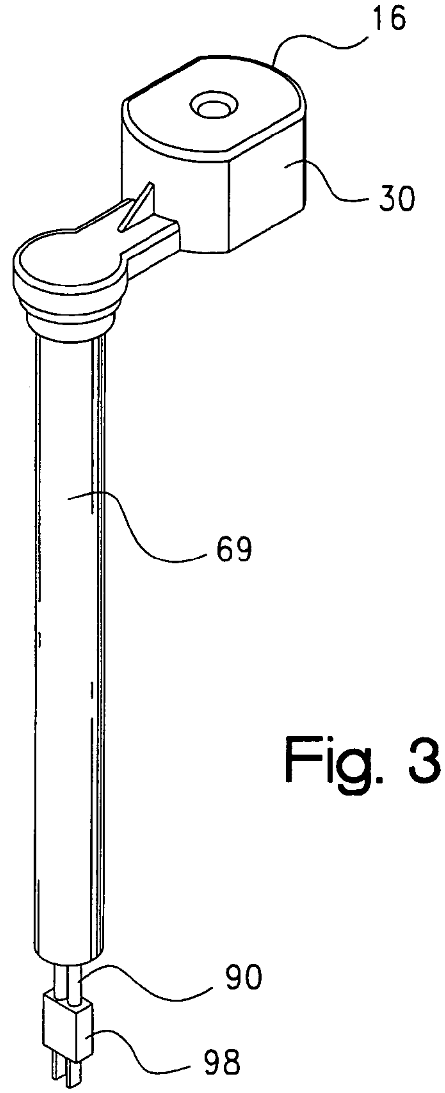
FIG. 3 is an elevated perspective view of a solenoid assembly for the valve assembly.
Figure 4:
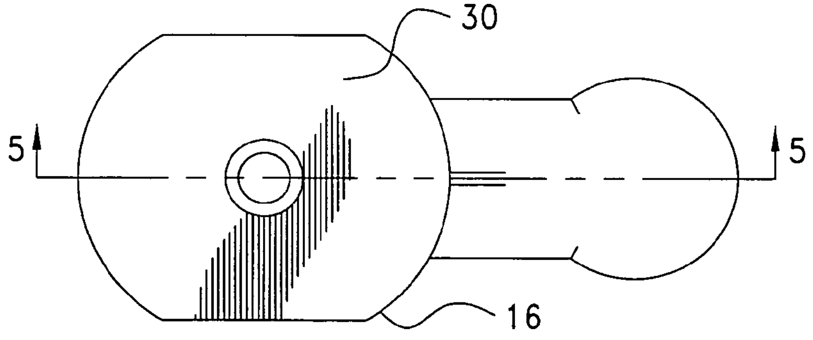
FIG. 4 is a top view of the solenoid assembly.

The manifold block 12 includes valve receiving chambers as at 20, each of which includes an inlet and outlet port and a valve seat. As shown in FIG. 2, each valve 14 includes a housing 21 enclosing a valve member 22 moveable in conjunction with an elongated, conductive (magnetic) armature 24 and separated therefrom by a diaphragm member 26. Diaphragm member 26, system pressure and a return spring maintain the valve member normally in a closed position, in engaging contact with the valve seat. The valve member can move away from the valve seat upon movement of the armature. The foregoing is only one example of a manifold block and valve structure appropriate for the present invention, and other configurations are possible, as should be appreciated by those skilled in the art.

Referring now to FIGS. 3–7 the solenoid assembly 16 for the manifold assembly includes a unitary, one-piece housing 30 formed of encapsulant. The encapsulant is a non-magnetic material that is preferably i) relatively rigid, ii) able to withstand high temperatures, iii) of good chemical resistance, and iv) of sufficient flame retardance such that it is appropriate for fuel (gasoline) pumping and distribution applications. The encapsulant should also be relatively easily moldable using conventional injection molding machinery and techniques; Preferably, the encapsulant is a thermoplastic such as Ryton (TM) polyphenylene sulfide available from CHEVRON PHILLIPS CHEMICAL COMPANY, LP, of The Woodlands, Texas; however, other materials, such as thermoset epoxies may be appropriate depending upon the particular application.

The solenoid assembly 16 further includes an electromagnetic device, indicated generally at 40, including a bobbin 42 and coil 44 which are preassembled by winding the coil around the bobbin. The bobbin is formed from a non-conductive material, such as plastic, and includes a central circular cavity 46, generally aligned along a central axis “A” of the solenoid assembly. The coil preferably comprises a magnet wire such as a NEMA Type MW35C or MW74C, or other appropriate wire. The number of windings of the coil around the bobbin can be determined upon the particular application, i.e., the desired magnetic flux.

A pair of terminals, indicated at 50, are electrically connected to the coil. The terminals 50 each generally comprise a conductive, elongated member having one end pressed-through the bobbin into electrical contact with the coil (and welded thereto, if necessary), and projecting outwardly away therefrom in the same direction. The terminals are also preferably preassembled with the coil and bobbin.

An inverted U-shaped yoke, indicated generally at 54, surrounds the bobbin and coil subassembly. Yoke 54 comprises a magnetically-conductive material (such as steel) and includes a circular opening 56 generally aligned with one end of the bobbin cavity 46. Opening 56 is dimensioned to closely receive a non-magnetic sleeve 58 (FIG. 2) of the valve when the armature 24 of the valve is inserted into the solenoid assembly.

Figure 6:
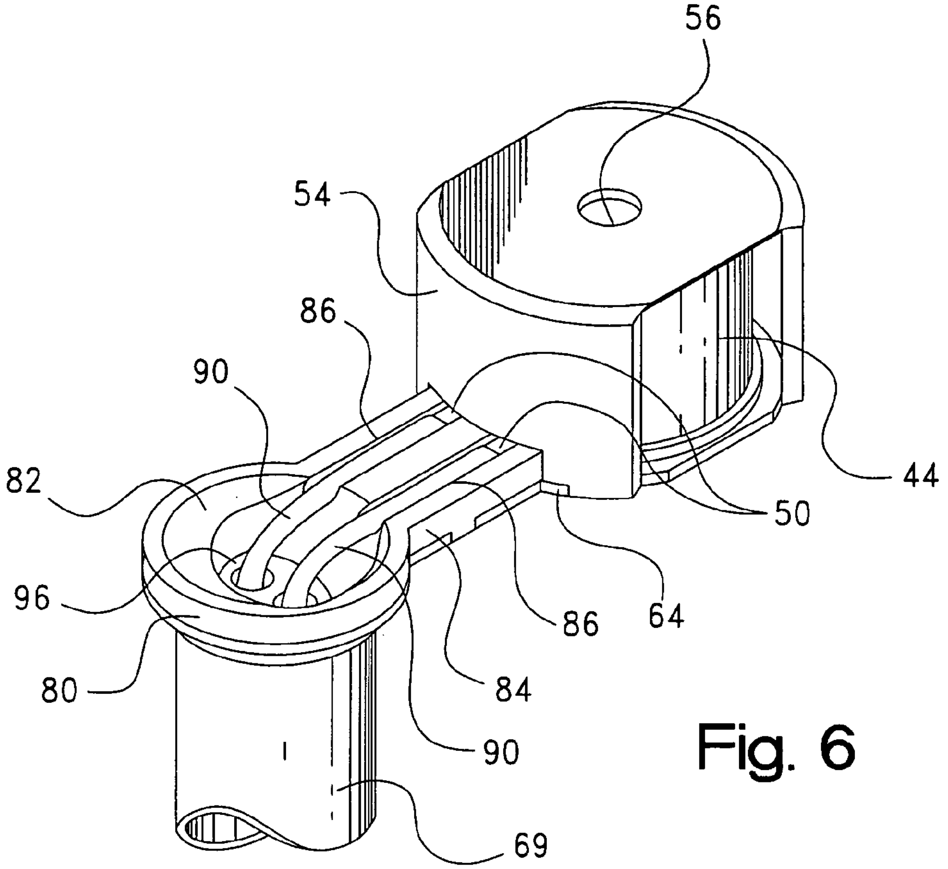
FIG. 6 is an elevated perspective view of the solenoid assembly, prior to being encapsulated.
Figure 7:
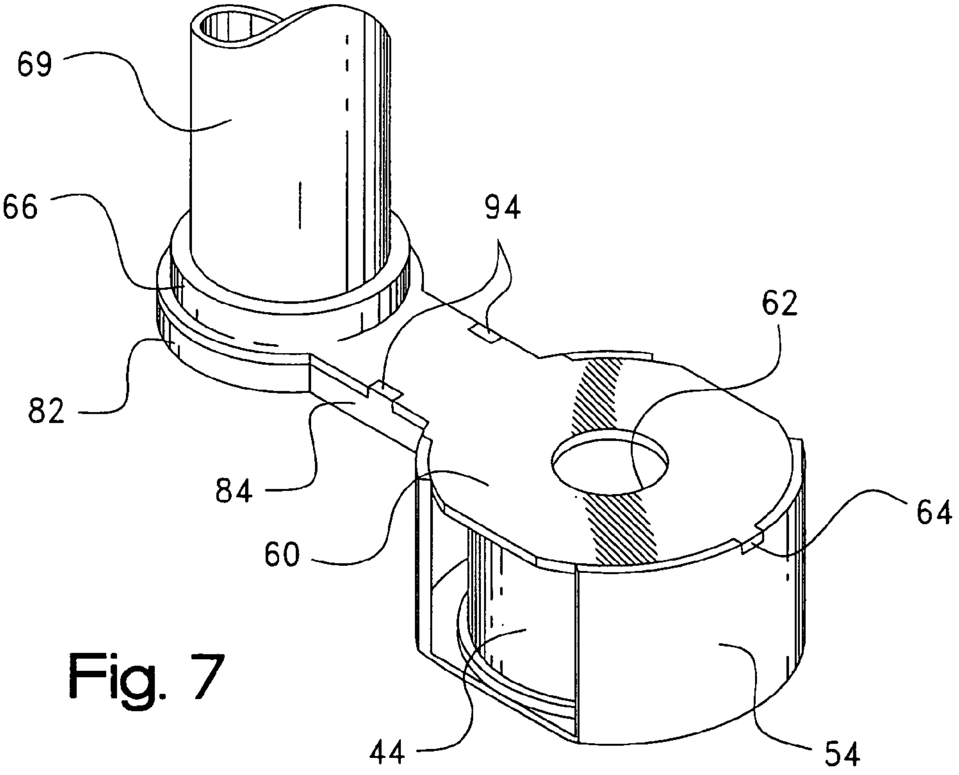
FIG. 7 is a perspective view from the bottom of the solenoid assembly, prior to being encapsulated.

A flux plate 60 underlays the yoke 54 and is electrically connected thereto. Flux plate 60 also comprises an elongated magnetically-conductive material (such as steel) and has a circular opening 62 generally aligned with the other end of the bobbin cavity 46 to receive the armature portion of the valve 14. As can be seen in FIGS. 6 and 7, the yoke includes a slot and the flux plate includes a tab which interengage and are staked as at 64 to the arms of the yoke 54 to facilitate assembly, although other attachment techniques could likewise be used. The flux plate serves as a supporting member for the solenoid assembly, and to this end, extends outwardly from the electromagnetic device and includes a circular opening defined by an annular flange 66, for receipt (by press-fit) of a hollow, tubular conduit 69, as will be described below in more detail.

An annular flux bushing 74 is provided internally of and toward one end of the bobbin 42. The flux bushing is in electrical contact with the flux plate, to concentrate and enhance the magnetic flux. Bushing 74 is also comprised of a magnetically-conductive material (such as steel), and is in electrical contact with flux plate 60. It is noted that a flux bushing is preferred to concentrate the flux, but in certain applications such a bushing may not be needed.

The solenoid assembly further includes an insulating plug 80 at one end of conduit 69, and closely received therein (such as by slip fit). Plug 80 is preferably formed from a relatively rigid, non-conductive material such as plastic, and includes a circular plug portion 82 sealing the one end of the conduit, and a flat support portion 84 disposed along the flux plate 60. The flat support portion 84 includes a pair of troughs or channels as at 86, extending the length of the support portion, which receive and support lead wires 90. The insulating plug serves as an insulating member between the terminals 50 and lead wires 90, and the flux plate 60. The flux plate 60 includes tabs which are received in slots in the support portion of the insulating plug, and can be fixed such as by staking as at 94, to facilitate assembly.

The lead wires 90 are preferably insulated wires, each of which are electrically connected (such as via welding) at one end to a terminal 50, extend the length of the support portion 84 of the insulating plug, and are then routed through appropriate holes in the circular plug portion 82. The plug helps arrange the wires, and prevent over-bending, to avoid damage. The wires then extend the length of the conduit 69, and project out the distal end. While a pair of lead wires are shown, it is possible that more or fewer wires could be used in certain applications, depending on the control necessary for the solenoid assembly. Potting compound as at 95 (such as an appropriate epoxy) is located in a well 96 of the circular plug portion 82 to seal the holes and prevent movement of the lead wires.

Figure 5:
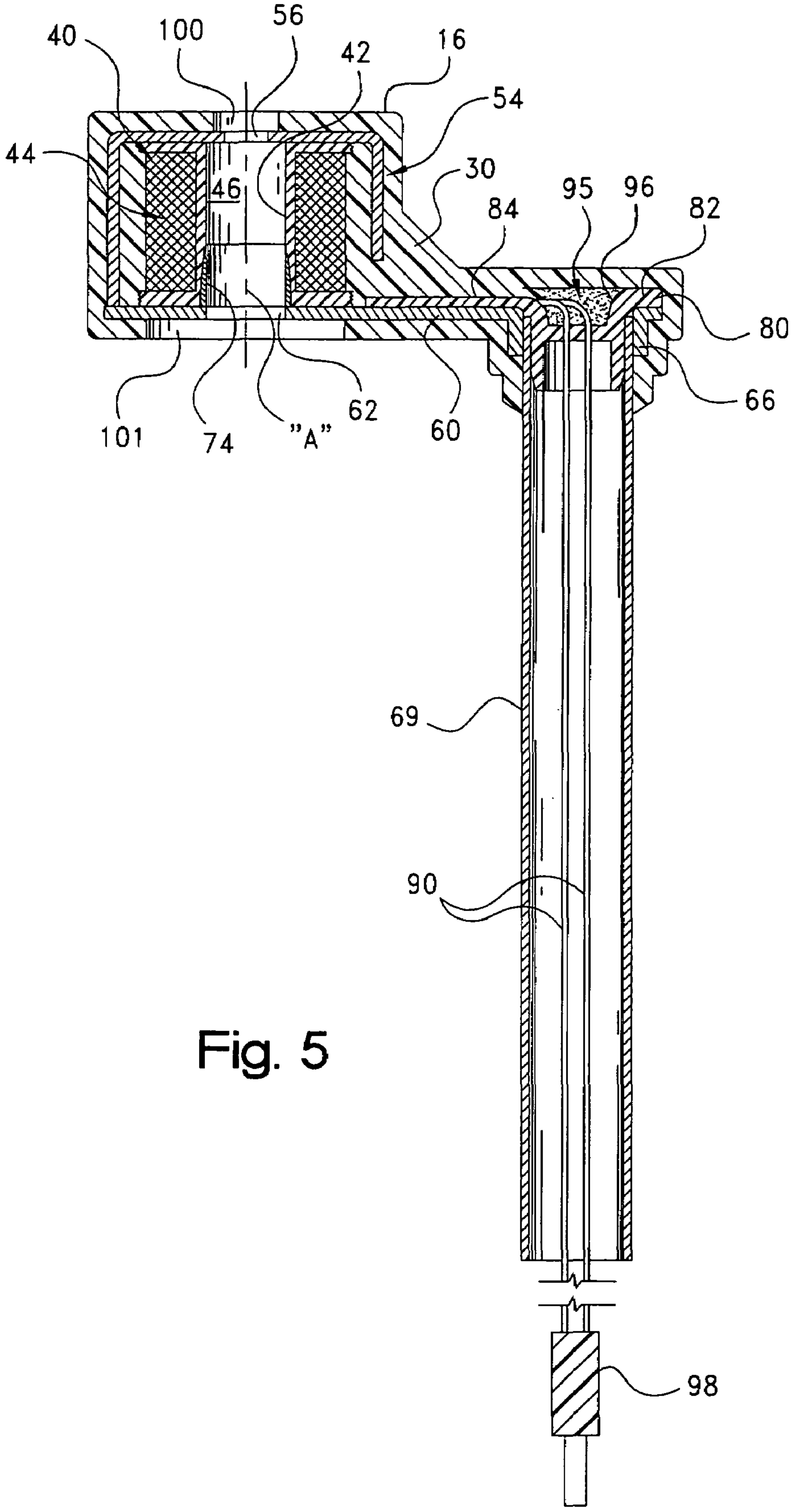
FIG. 5 is a cross-sectional side view of the solenoid assembly taken substantially along the plane described by the lines 5—5 of FIG. 4.

As can be seen particularly in FIG. 5, the conduit 69 is an elongated, straight tube, and extends substantially parallel to the central axis “A” of the solenoid assembly, although of course in some situations, the conduit could be bent, or at an angle to the axis. Conduit 69 is typically formed from metal, although other materials may be appropriate in certain applications. The surrounding flange 66 in the flux plate provides strength for the embedded end of the conduit tube. The lead wires project outwardly from the distal end of the conduit, and in certain applications, can include a connector assembly 98 to facilitate connection of the solenoid assembly with the electrical control circuit (current source) for the manifold assembly. Other applications may of course have the lead wires hard-wired in to such circuit.

Once the coil 44 and bobbin 42 subassembly, terminals 50, lead wires 90, yoke 54, flux plate 60, insulating plug 80 and conduit 69 are assembled, the assembly is put into a mold, and the encapsulant is introduced (injected) around the components such that the components become embedded in the encapsulant. The potting compound 95 in the well 96 of the insulating plug prevents the encapsulant from leaking down into the conduit 69. Openings 100 and 101 are retained into the opposite ends of cavity 46 of the solenoid assembly such that the valve 14 can be inserted therein. The encapsulant is allowed to cool, and the resulting rigid structure is then removed from the mold.

The coil 44 and bobbin 42 subassembly, terminals 50, flux plate 60, and yoke 54 are completely encased in the encapsulant (except for small portions of the yoke 54 and flux plate 60 exposed through openings 100 and 101), while the lead wires 90 and conduit 69 each have one end which is embedded in the encapsulant, and distal ends, free of the encapsulant. The encapsulant creates a rigid, unitary housing structure which locates and retains all the internal components of the electromagnetic device, the lead wires and the conduit. There is no further external housing necessary for the solenoid assembly, and it is particularly noted that no potting or seal is necessary at the distal end of the conduit—rather, the conduit is completely sealed at its embedded end. Since there are no threaded fittings, there is no requirement for stringent testing as a general-purpose conduit connection. The conduit can have a thinner wall, and not be explosion-proof, which also reduces cost.

Referring again to FIGS. 2 and 5, the valve 14 is inserted into the solenoid assembly such that armature 24 is received through the lower opening 101 in housing 16; through opening 62 in flux plate 60, and through cavity 46, and projects outwardly through opening 56 in yoke 54, and upper opening 100 in housing 16. A nut or other fastener 105 is received down about the sleeve 58 surrounding the armature to retain the armature in the housing. In certain applications it is noted that the upper opening 100 may not be present, and the sleeve 58 could be merely supported internally of the housing by some means. In any case, as should be appreciated, when an electrical current is applied to the lead wires 90, the coil 44 is energized via the connection with the terminals 50, and electromagnetic forces create a magnetic field within the bobbin 42. A flux field is created between the flux plate 60 and yoke 54, and the bobbin/coil subassembly; while the flux bushing 74 facilitates focusing this magnetic field through the non-magnetic armature sleeve. The energization of the coil causes the armature 24, and hence the valve member 22, to move away from the valve seat, thereby opening the valve.

Thus, the present invention provides a solenoid-operated valve, appropriate for certain hazardous applications, which has an integral vapor barrier making the solenoid assembly inherently explosion-proof. Encapsulating the components of the electromagnetic device of the solenoid assembly creates a vapor-tight seal without the need for plumbing through a vapor barrier, or extensive potting of the conduit. The integral conduit does not have to be qualified for conformance to explosion-proof conduit systems (as there are no threaded fittings), which reduces the cost of manufacturing the solenoid assembly. The cost and complexity of manufacturing the solenoid assembly is thereby reduced.

The principles, preferred embodiments and modes of operation of the present invention have been described in the foregoing specification. The invention which is intended to be protected herein should not, however, be construed as limited to the particular form described as it is to be regarded as illustrative rather than restrictive. Variations and changes may be made by those skilled in the art without departing from the scope and spirit of the invention as set forth in the appended claims.

What is claimed is:

1. A solenoid assembly, comprising:

a) a unitary, one-piece housing comprised of encapsulant, b) an electromagnetic device completely encompassed by and embedded in the encapsulant, the electromagnetic device including:

i) a bobbin and coil subassembly, the bobbin having a central cavity and circumscribing a central axis and the coil wound around the bobbin, and an opening in the housing into the central cavity for receipt of a valve;

ii) terminal means electrically connected to the coil;

iii) a yoke surrounding the subassembly; and iv) a flux plate with an opening into the central cavity, the flux plate electrically connected to the yoke and electrically insulated from the coil such that a flux gap is provided between the coil and yoke;

c) lead wires having one end embedded in the encapsulant and electrically connected to the terminal means;

d) a hollow conduit having one end thereof embedded in the encapsulant and receiving and enclosing the lead wires, and having a distal end, free of encapsulant; and e) an insulating plug located within the conduit at the one end thereof, the lead wires extending through the insulating plug;

whereby upon energization of the coil by a current applied to the lead wires, electromagnetic forces generate a magnetic field within the central cavity for movement of a valve member.

2. The solenoid assembly as in claim 1, wherein the lead wires extend the length of the conduit and project outwardly from the distal end of the conduit, and further including a connector assembly at the distal end of the lead wires exterior to the conduit for connecting the solenoid assembly to a current source.

3. The solenoid assembly as in claim 1, wherein the insulating plug includes a circular plug portion sealing the one end of the conduit, and a flat support portion disposed along the flux plate, and between the flux plate and the lead wires and terminal to electrically insulate the lead wires and terminal means from the flux plate.

4. The solenoid assembly as in claim 3, wherein the support portion of the insulating plug is embedded in the encapsulant.

5. The solenoid assembly as in claim 3, wherein the support portion includes a trough extending from the plug portion to the terminal means, and the lead wires are received and arranged in the trough.

6. The solenoid assembly as in claim 1, wherein the insulating plug is plastic.

7. The solenoid assembly as in claim 1, wherein the encapsulant is a non-magnetic, moldable material.

8. The solenoid assembly as in claim 7, wherein the encapsulant is a thermoplastic or theremoset epoxy.

9. A solenoid assembly, comprising:

a) a unitary, one-piece housing comprised of encapsulant, b) an electromagnetic device completely encompassed by and embedded in the encapsulant, the electromagnetic device including:

i) a bobbin and coil subassembly, the bobbin having a central cavity and circumscribing a central axis and the coil wound around the bobbin, and an opening in the housing into the central cavity for receipt of a valve;

ii) terminal means electrically connected to the coil;

iii) a yoke surrounding the subassembly; and iv) a flux plate with an opening into the central cavity, the flux plate electrically connected to the yoke and electrically insulated from the coil such that a flux gap is provided between the coil and yoke;

c) lead wires having one end embedded in the encapsulant and electrically connected to the terminal means; and d) a hollow conduit having one end thereof embedded in the encapsulant and receiving and enclosing the lead wires, and having a distal end, free of encapsulant, wherein the flux plate includes a second opening closely receiving and supporting the conduit;

whereby upon energization of the coil by a current applied to the lead wires, electromagnetic forces generate a magnetic field within the central cavity for movement of a valve member.

10. The solenoid assembly as in claim 1, wherein the conduit extends parallel to the central axis of the assembly.

11. The solenoid assembly as in claim 1, wherein the housing is the outermost container for the electromagnetic device.

12. The solenoid assembly as in claim 1, further including a flux bushing closely received in the central cavity of the subassembly to concentrate magnetic flux in the central cavity.

13. A solenoid assembly for a valve, comprising:

a) a unitary, one-piece housing comprised of non-magnetic encapsulant, b) an electromagnetic device completely encompassed by and embedded in the encapsulant, the electromagnetic device including:

i) a bobbin and coil subassembly, the bobbin having a central cavity and circumscribing a central axis and the coil wound around the bobbin, openings in the housing into the central cavity, and the central cavity of the bobbin dimensioned to receive a portion of the valve;

ii) terminal means electrically connected to the coil;

iii) a yoke surrounding the subassembly with a first opening at one end of the bobbin into the central cavity; and iv) a flux plate with a second opening at another end of the bobbin into the central cavity, the flux plate electrically connected to the yoke and electrically insulated from the coil such that a flux gap is provided between the coil and yoke;

c) lead wires having one end embedded in the encapsulant and electrically connected to the terminal means;

d) a hollow conduit having one end thereof embedded in the encapsulant and receiving and enclosing the lead wires, and having a distal end, free of encapsulant; and e) an insulating plug at the one end of the conduit, with the lead wires extending through the plug and the plug electrically insulating the lead wires and terminal means from the flux plate;

whereby upon energization of the coil by a current applied to the lead wires, electromagnetic forces generate a magnetic field which can be transmitted to an armature in the valve portion.

14. A valve assembly, comprising:

a valve;

a solenoid assembly for actuating said valve, the solenoid assembly including a unitary, one-piece housing comprised of encapsulant, an electromagnetic device encompassed by and embedded in the encapsulant, the electromagnetic device including:

i) a bobbin and coil subassembly, the subassembly circumscribing a central axis and having a central cavity receiving the valve through an opening in the housing;

ii) terminal means electrically connected to the coil;

iii) a yoke surrounding the subassembly; and iv) a flux plate with an opening into the central cavity with the valve projecting through the opening, the flux plate electrically connected to the yoke and electrically insulated from the coil such that a flux gap is provided between the coil and yoke;

lead wire means having one end embedded in the encapsulant and electrically connected to the terminal means; and a hollow conduit having one end thereof embedded in the encapsulant and receiving and enclosing the lead wire means; and an insulating plug located within the conduit at the one end thereof, the wire means extending through the insulating plug;

whereby upon energization of the coil by a current applied to the lead wire means, electromagnetic forces generate a magnetic field which can be transmitted to the valve to move a valve member in the valve.

15. The solenoid assembly as in claim 14, wherein the wire means extends the length of the conduit and projects outwardly from the distal end of the conduit, and further including a connector assembly at the distal end of the wire means exterior to the conduit for connecting the solenoid assembly to a current source.

16. The solenoid assembly as in claim 14, wherein the insulating plug includes a circular plug portion sealing the one end of the conduit, and a flat support portion disposed along the flux plate, and between the flux plate and the wire means and terminal to electrically insulate the wire means and terminal means from the flux plate.

17. The solenoid assembly as in claim 16, wherein the support portion of the insulating plug is embedded in the encapsulant.

18. The solenoid assembly as in claim 16, wherein the support portion includes a trough extending from the plug portion to the terminal means, and the wire means are received and supported in the trough.

19. The solenoid assembly as in claim 14, wherein the insulating plug is plastic.

20. The solenoid assembly as in claim 14, wherein the encapsulant is a moldable, non-conductive material.

21. The solenoid assembly as in claim 20, wherein the encapsulant is a thermoplastic or thermoset epoxy.

22. A valve assembly, comprising:

a valve;

a solenoid assembly for actuating said valve, the solenoid assembly including a unitary, one-piece housing comprised of encapsulant, an electromagnetic device encompassed by and embedded in the encapsulant, the electromagnetic device including:

i) a bobbin and coil subassembly, the subassembly circumscribing a central axis and having a central cavity receiving the valve through an opening in the housing;

ii) terminal means electrically connected to the coil;

iii) a yoke surrounding the subassembly; and iv) a flux plate with an opening into the central cavity with the valve projecting through the opening, the flux plate electrically connected to the yoke and electrically insulated from the coil such that a flux gap is provided between the coil and yoke;

lead wire means having one end embedded in the encapsulant and electrically connected to the terminal means; and a hollow conduit having one end thereof embedded in the encapsulant and receiving and enclosing the lead wire means, wherein the flux plate includes a second opening closely receiving and supporting the conduit;

whereby upon energization of the coil by a current applied to the lead wire means, electromagnetic forces generate a magnetic field which can be transmitted to the valve to move a valve member in the valve.

23. The solenoid assembly as in claim 14, wherein the conduit extends parallel to the central axis of the assembly.

24. The solenoid assembly as in claim 14, wherein the housing is the outermost container for the electromagnetic device.

25. The solenoid assembly as in claim 14, further including a flux bushing closely received in the central cavity of the subassembly to concentrate magnetic flux in the central cavity.

26. A solenoid assembly, comprising:

a) a unitary, one-piece housing comprised of encapsulant, b) an electromagnetic device encompassed by and embedded in the encapsulant, the electromagnetic device including:

i) a bobbin and coil subassembly, the bobbin having a central cavity and circumscribing a central axis and the coil wound around the bobbin, and an opening in the housing into the central cavity for receipt of a valve;

ii) a terminal electrically connected to the coil;

iii) a yoke surrounding the subassembly; and iv) a flux plate with an opening into the central cavity, the flux plate electrically connected to the yoke and electrically insulated from the coil such that a flux gap is provided between the coil and yoke;

c) lead wire means electrically connected to the terminal and at least partially embedded in the encapsulant;

d) a hollow conduit having one end thereof embedded in the encapsulant and receiving and enclosing the lead wires means, and having a distal, free end; and e) a vapor barrier plug at the one end of the hollow conduit, the wire means extending through the vapor barrier plug and into the hollow conduit;

whereby upon energization of the coil by a current applied to the lead wire means, electromagnetic forces generate a magnetic field within the central cavity for movement of a valve member.

27. The solenoid assembly as in claim 26, wherein the wire means comprises at least one wire connected to the terminal, and wherein the at least one wire is at least partially embedded in the encapsulant, and extends through the vapor barrier plug.

28. The solenoid assembly as in claim 27, wherein the at least one wire is completely embedded in the encapsulant from the terminal to the vapor barrier plug.

29. The solenoid assembly as in claim 28, wherein the at least one wire extends from the vapor barrier plug through the length of the conduit.

30. The solenoid assembly as in claim 26, wherein the vapor barrier plug is an insulating member.

31. The solenoid assembly as in claim 26, wherein the vapor barrier plug includes a potting compound.

32. The solenoid assembly as in claim 26, wherein the vapor barrier plug includes a sealing plug portion within the one end of the conduit.

* * * * *